(12) United States Patent
Suzuki

(10) Patent No.: US 11,648,670 B2
(45) Date of Patent: May 16, 2023

(54) MACHINE TOOL SYSTEM

(71) Applicant: OKUMA Corporation, Aichi (JP)

(72) Inventor: Kenji Suzuki, Aichi (JP)

(73) Assignee: OKUMA CORPORATION, Aichi (JP)

( * ) Notice: Subject to any disclaimer, the term of this patent is extended or adjusted under 35 U.S.C. 154(b) by 463 days.

(21) Appl. No.: 16/665,422

(22) Filed: Oct. 28, 2019

(65) Prior Publication Data

US 2020/0130184 A1    Apr. 30, 2020

(30) Foreign Application Priority Data

Oct. 29, 2018   (JP) .............................. JP2018-203203

(51) Int. Cl.
*B25J 9/16*        (2006.01)

(52) U.S. Cl.
CPC .......... *B25J 9/1666* (2013.01); *B25J 9/1605* (2013.01); *B25J 9/1676* (2013.01); *B25J 9/1633* (2013.01)

(58) Field of Classification Search
CPC ... B25J 9/16; B25J 9/1602; B25J 9/161; B25J 9/1656; B25J 9/1664; B25J 9/1666; B25J 9/1674; B25J 9/1676; B25J 9/1605; B25J 9/1628; B25J 9/1633; B25J 11/00; B25J 11/005; Y02P 90/00; Y02P 90/02; G05B 19/00; G05B 19/02; G05B 19/18; G05B 19/19; G05B 19/409; G05B 19/406; G05B 19/4069; G05B 19/4155; G05B 19/41815; G05B 19/418; G05B 19/41825; G05B 19/4142; G05B 19/414; G05B 2219/34; G05B 2219/34013

(Continued)

(56) References Cited

U.S. PATENT DOCUMENTS

2013/0116822 A1   5/2013   Atohira
2013/0166068 A1   6/2013   Yanagita et al.
(Continued)

FOREIGN PATENT DOCUMENTS

EP    1085389 A1    3/2001
JP    H06028019 A   2/1994
(Continued)

OTHER PUBLICATIONS

JPO Notice of Reasons for Refusal for corresponding JP Application No. 2018-203203; dated May 31, 2022.
(Continued)

*Primary Examiner* — Khoi H Tran
*Assistant Examiner* — Sarah A Tran
(74) *Attorney, Agent, or Firm* — Cantor Colburn LLP

(57) ABSTRACT

A machine tool system is disclosed which can shorten time required for generating a robot program even for a machine tool user who has no experience in using a robot. A machine tool controller includes an operation panel and an interactive program generator, and sets an operation parameter of the robot using a template screen prepared for each stylized operation of the robot. The interactive program generator generates a robot preprogram using the set operation parameter, reads the robot preprogram during execution of a machine tool program, and transfers the program to a robot preprocessor. The robot preprocessor interprets the robot preprogram and outputs a control command to a robot controller.

15 Claims, 6 Drawing Sheets

(58) Field of Classification Search
USPC .......................................................... 700/245
See application file for complete search history.

(56) References Cited

U.S. PATENT DOCUMENTS

| | | | |
|---|---|---|---|
| 2017/0028558 A1* | 2/2017 | Nishi | B25J 9/1692 |
| 2017/0190052 A1* | 7/2017 | Jaekel | B25J 9/1671 |
| 2017/0320211 A1* | 11/2017 | Akan | G06F 8/34 |

FOREIGN PATENT DOCUMENTS

| | | |
|---|---|---|
| JP | 2001154717 A | 6/2001 |
| JP | 2013099815 A | 5/2013 |
| JP | 2013134786 A | 7/2013 |
| JP | 2013184242 A | 9/2013 |
| JP | 2017027501 A | 2/2017 |

OTHER PUBLICATIONS

JPO Notification for corresponding JP Application No. 2018-203203; Dated Mar. 8, 2022.

\* cited by examiner

[OPERATION TO BE GENERATED]
WORKPIECE UNLOADING

[OPERATION PARAMETER(S)]

| 1 | AIR EJECTION DURING GRIPPING | EXECUTE |
|---|---|---|
| 2 | PUSHER | USE |
| 3 | WORKPIECE WITHDRAWAL AMOUNT | 80 |
| 4 | GRIP APPROACH AMOUNT | 50 |
| 5 | GRIP OFFSET | 100 |

GUIDE DRAWING

PROVISIONAL POSITION INDEXING | READ CURRENT POSITION | | | | OUTPUT PROGRAM

FIG. 6

MACHINE TOOL SYSTEM

CROSS REFERENCE TO RELATED APPLICATION

The present invention claims priority under 35 U.S.C. § 119 to Japanese Patent Application No. 2018-203203 filed on Oct. 29, 2018, the entire content of which is incorporated herein by reference.

TECHNICAL FIELD

The present disclosure relates to a machine tool system, and in particular to a machine tool system having a robot teaching function.

BACKGROUND

In recent years, due to shortage of labor, in the manufacturing industry, in particular, in mid-size and small-size companies and in small-size factories such as small town factories, introduction of industrial robots for automation and reduction of the number of workers is becoming necessary.

In order to operate an industrial robot, it is necessary to program a movement path by teaching movement points, but for a machine tool user who has no experience in using the robot, it is necessary to newly learn an operation method of the robot and programming, which forms a barrier in introducing robots.

JP 2001-154717 A discloses a technique which enables operation of a robot of a machine equipped with the robot, by a machine controller. A controller of an injection molding machine equipped with a robot and a robot controller are connected by a communication line, and a means for generating an operation program of the robot, and a calibration means for correlating coordinate systems of the robot and of the injection molding machine are provided on the controller of the injection molding machine, a display device, an inputting means, and an operation panel. The robot operation program generated by the controller of the injection molding machine is sent via the communication line to the robot controller, and the robot operates based on the program.

When a machine tool user who has no experience in using the robot introduces a robot and utilizes a machining cell, the following problems arise.

(1) Because the user must learn the operation method, the teaching method, and the programming of the robot from the basics, and the robots have operation systems different from those of the machine tool, a long time is required for the user to become proficient.

(2) For the machine tool and the robot, the operations are executed by respective controllers, and thus, a function to check for interference when the control target is operated is normally provided on each controller. However, when the machine tool and the robot operate with respect to each other, the environment for checking the interference changes at all times, and the interference checking cannot be executed. Although there is realized a function which can generate the program by executing a simulation of a machining cell including the machine tool and the robot in off-line work on a PC (personal computer) having superior processing capability, the simulation is merely checking of the operation in a determined sequence, and thus, the simulation cannot handle a sudden change of the state.

(3) The programs for the machine tool and the robot must be managed by the respective controllers, which results in complexity. In general, in order to execute a robot program, there is employed a configuration in which the program is read in advance into a storage region of a robot controller, and a command is made as to which program in which storage region is to be executed. In a line production system, because a frequency of exchange of stages is low, this does not tend to become problematic, but for machine tool users requiring wide-variety, small-quantity production, the number of programs is inevitably increased, and human errors tend to occur when the program is read into the storage region. Regarding this point, although automatic selection can be realized by providing a superior device such as an FMS (flexible manufacturing system) and an FMC (flexible manufacturing cell), as such a configuration would increase a robot introduction cost, such a configuration becomes a barrier in introducing the robots.

An advantage of the present disclosure lies in provision of a technique which can shorten the time required for generating a robot program even for a user of a machine tool who has no experience of using a robot or who is not necessarily proficient in robot operation.

SUMMARY

According to one aspect of the present disclosure, there is provided a machine tool system comprising: a machine tool controller that controls a machine tool; and a robot preprocessor that is connected to the machine tool controller in a manner to allow transmission and reception of data, wherein the machine tool controller comprises: an operation panel which sets an operation parameter of a robot and which enables manual operation of the robot; a robot preprogram generator which generates a robot preprogram using the set operation parameter and the manual operation; a controller which controls the machine tool by executing a machine tool program and which transmits the robot preprogram to the robot preprocessor; and a notifier which notifies manual operation information to the robot, and the robot preprocessor comprises: a robot preprogram executer which receives the robot preprogram transmitted from the machine tool controller and outputs a control command to a robot controller which controls the robot according to the robot preprogram; and a control command outputter which outputs a robot control command based on the manual operation information.

According to another aspect of the present disclosure, in the machine tool system, the machine tool controller further comprises an interference checker which checks presence or absence of interference between the machine tool and the robot based on 3D models of the machine tool and the robot.

According to another aspect of the present disclosure, tin the machine tool system, the robot preprocessor further comprises a communicator which transmits a joint angle of the robot to the machine tool controller, and the interference checker checks the presence or absence of the interference between the machine tool and the robot using the joint angle of the robot.

According to another aspect of the present disclosure, in the machine tool system, the machine tool controller further comprises a communicator which transmits the 3D model of the machine tool to the robot preprocessor, and the robot preprogram executer generates a path of the robot which avoids interference with the machine tool based on the 3D model, and outputs the control command.

According to another aspect of the present disclosure, in the machine tool system, the controller of the machine tool controller executes a machine tool program, and transmits the robot preprogram to the robot preprocessor based on a name of the robot preprogram described in the machine tool program.

According to another aspect of the present disclosure, in the machine tool system, the robot preprogram generator of the machine tool controller generates a template screen for each stylized operation of the robot, and displays the template screen on a display of the operation panel, and the operation parameter is set on the template screen.

According to another aspect of the present disclosure, in the machine tool system, the robot preprogram generator of the machine tool controller indexes the robot using the set operation parameter, and, when the indexed position of the robot is finely adjusted by the manual operation, generates the robot preprogram while reflecting a position after the fine adjustment in the operation parameter.

According to another aspect of the present disclosure, in the machine tool system, the machine tool controller further comprises a first storage unit which stores the robot preprogram and the 3D model, and the robot preprocessor further comprises a second storage unit which stores the robot preprogram and the 3D model transmitted from the machine tool controller.

According to another aspect of the present disclosure, in the machine tool system, the robot preprogram and the 3D model are read from the first storage unit of the machine tool controller, are transmitted to the robot preprocessor, and are stored in the second storage unit each time a request for execution of the robot preprogram is made during execution of the machine tool program.

The machine tool controller and the robot preprocessor of the present disclosure may be formed separately, the robot preprocessor may be equipped on the machine tool controller, or the robot preprocessor may be equipped on the robot controller. The robot preprogram generator, the controller, the notifier, and the like may be formed to include a first processor such as a CPU and a first memory which stores a program and a control parameter. The first processor is configured to execute a program stored in the first memory, to execute various processes. The robot preprogram executer, the control command outputter, and the like may be formed to include a second processor such as a CPU and a second memory which stores a program and a control parameter. The second processor is configured to execute a program stored in the second memory, in order to execute various processes.

According to various aspects of the present disclosure, a user of a machine tool can manually operate the robot using the operation panel of the machine tool controller, and can generate the robot preprogram by setting an operation parameter of the robot using the operation panel. Further, using the operation parameter of the robot, the robot may be indexed to a teaching point avoiding interference, and fine adjustment of the position can be easily achieved.

Further, according to various aspects of the present disclosure, because the robot preprogram is transmitted from the machine tool controller to the robot preprocessor when the machine tool program is executed, it is possible to prevent, for example, program selection errors during a stage exchange.

BRIEF DESCRIPTION OF DRAWINGS

Embodiment(s) of the present disclosure will be described based on the following figures, wherein:

FIG. 6 is an explanatory diagram of interactive program generation according to an embodiment of the present disclosure.

DESCRIPTION OF EMBODIMENTS

An embodiment of the present disclosure will now be described with reference to the drawings.

Figure 1:
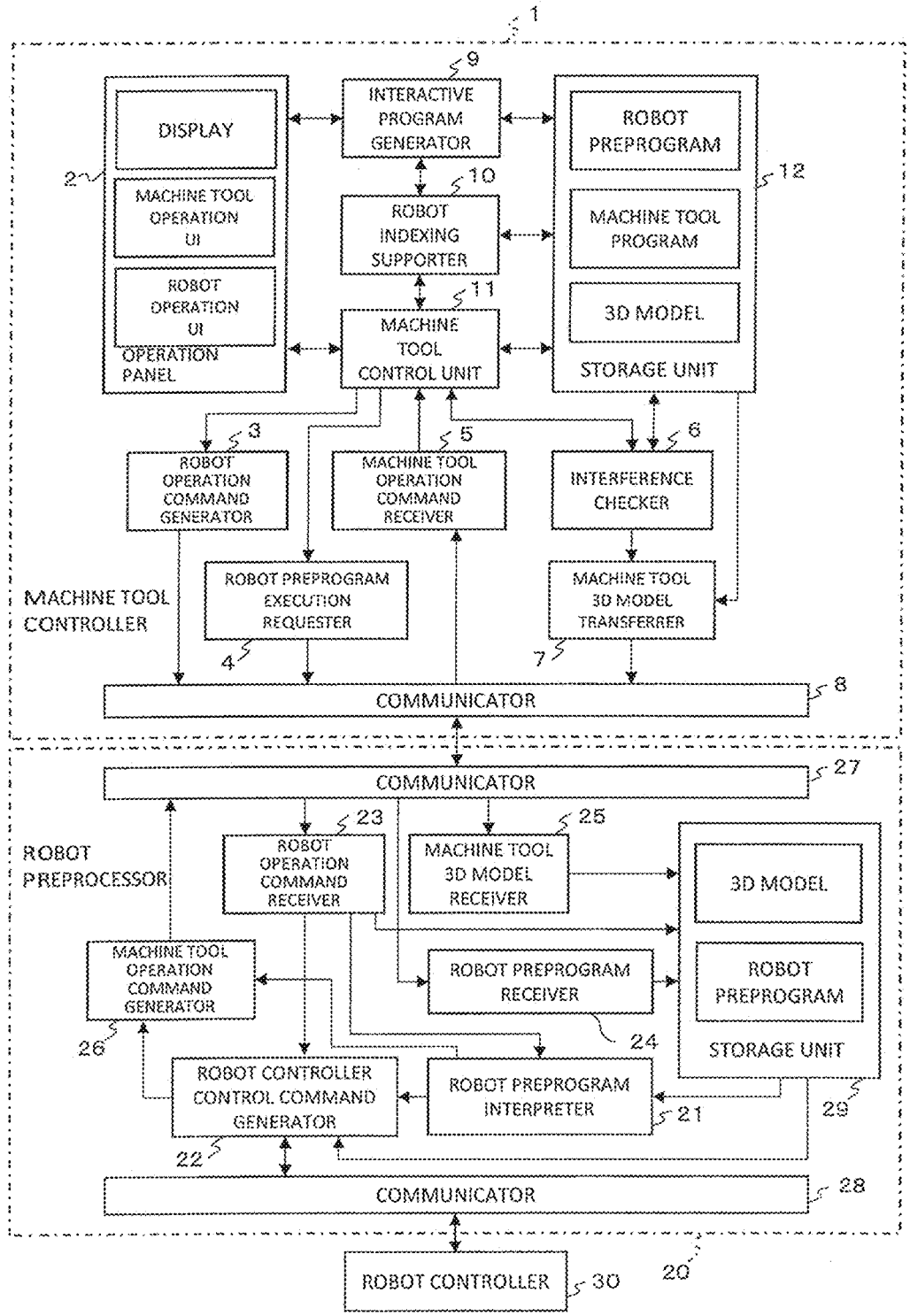
FIG. 1 is a structural block diagram of an embodiment of the present disclosure.

FIG. 1 is a system structural diagram of an embodiment of the present disclosure. The present system is a system seeking ease of operation of a robot, and is specialized in requesting execution of a task from a machine tool to the robot.

The present system comprises a machine tool controller 1, a robot preprocessor 20, and a robot controller 30. The machine tool controller 1 and the robot preprocessor 20 are connected to each other via a communication line to allow transmission and reception of data, and the robot preprocessor 20 and the robot controller 30 are connected to each other via a communication line to allow transmission and reception of data. The communication line is, for example, Ethernet (registered trademark), but is not limited thereto.

First, the machine tool controller 1 will be described.

The machine tool controller 1 is a controller (numerical controller) which controls an operation of a machine tool, and comprises an operation panel 2, a robot operation command generator 3, a robot preprogram execution requester 4, a machine tool operation command receiver 5, an interference checker 6, a machine tool 3D (three-dimensional) model transferrer 7, a communicator 8, an interactive program generator 9, a robot indexing supporter 10, a machine tool control unit 11, and a storage unit 12.

The operation panel 2 is formed from a display, a machine tool operation UI (user interface), and a robot operation UI. A machine tool user uses the robot operation UI to operate a jog (movement operation) of the robot and an end effector. The robot operation UI generates a robot preprogram by a cooperation with the machine tool operation UI and the interactive program generator 9. The robot operation UI outputs operation information to the machine tool control unit 11.

The robot operation command generator 3 converts the operation information or the like of the robot operation UI which is output from the machine tool control unit 11 into a command for the robot preprocessor 20 provided between the machine tool controller 1 and the robot controller 30. The robot operation command generator 3, for example, transmits an override value of the machine tool operation UI to the robot preprocessor 20 so that a change of an operation speed by an override operation is shared between the machine tool and the robot. In addition, a robot operation command is generated from an input of a pulse handle provided on the machine tool operation UI and is transmitted to the robot preprocessor 20 so as to enable operation of the robot. With this configuration, even if there is no teaching pendant of the robot, a manual operation of the robot by only the operation panel provided on the machine tool controller 1 is enabled, and even a machine tool user who is not accustomed to operation of a robot may intuitively operate the robot. The robot operation command generator 3 also transmits to the robot preprocessor 20 an axis position of the machine tool used in the robot preprocessor 20.

In response to an execution command from the machine tool control unit 11, the robot preprogram execution requester 4 transmits an execution request to the robot preprocessor 20. When the execution is requested, the robot preprogram execution requester 4 transfers to the robot preprocessor 20 a designated robot preprogram stored in the storage unit 12 of the machine tool controller 1. The designation of the robot preprogram is done by describing a name in a machine tool program (machining program). With this configuration, the task of the robot can be executed from the machine tool while operability similar to execution of a macro in the machine tool program is maintained.

The machine tool operation command receiver 5 receives the machine tool operation command transmitted from the robot preprocessor 20. The machine tool operation command receiver 5 transfers the command received from the robot preprocessor 20 to the machine tool control unit 11, and the machine tool control unit 11 executes the command. The machine tool operation command includes joint angle information of the robot.

The interference checker 6 checks for interference in real time during an operation of the machine tool using a 3D model. The 3D model is formed from 3D model data of the machine tool and the robot, including peripheral devices such as a workpiece stocker. The 3D model data of the machine tool include 3D model data of the workpiece. The interference checker 6 takes into consideration the joint angle of the robot which is output from the machine tool control unit 11, to check for the interference even in a situation where the machine tool and the robot operate with respect to each other.

The machine tool 3D model transferrer 7 reads, from the storage unit 12, the 3D model which is stored in the storage unit 12 and which is used by the machine tool controller 1, and transfers the read 3D model to the robot preprocessor 20. The 3D model is used for matching a simulation environment of the robot preprocessor 20 when the simulation environment of the machine tool controller 1 is changed such as when the tool is changed. The 3D model is also used when an entry prohibited zone of the robot is to be designated when the machine tool and the robot are operated simultaneously. For example, a shape of a rectangular parallelepiped or the like containing a region where the machine tool operates is transmitted to the robot preprocessor 20, so that the robot preprocessor 20 can generate a robot path to avoid interference with the entry prohibited zone of the robot. Alternatively, the machine tool 3D model transferrer 7 may add information of the axis position of the machine tool to the 3D model and then transfer the 3D model.

The communicator 8 executes a communication process between the machine tool controller 1 and the robot preprocessor 20. As described above, an example of the communicator 8 is Ethernet (registered trademark), but when a real time property and time synchronization or the like of the communication is necessary, a communication means corresponding thereto may be used.

The interactive program generator 9 generates the robot preprogram by cooperation with the machine tool operation UI and the robot operation UI. The interactive program generator 9 stylize the tasks of the robot in advance, and automatically generates the robot preprogram including parameters which are input by the user of the machine tool. With this configuration, the user of the machine tool can easily generate the robot preprogram by merely inputting the parameters, and can operate the robot. Alternatively, the interactive program generator may include a UI for executing the robot indexing supporter 10, and can determine a teaching point from a current position of the robot. The interactive program generator 9 stores the generated robot preprogram in the storage unit 12.

The robot indexing supporter 10 supports indexing of the robot to a designated point. Specifically, when a fine adjustment of the position is necessary in the interactive program generator 9, if the user of the machine tool is to execute the jog operation to the teaching point as in the related art, the difficulty of the work is increased. Thus, the robot indexing supporter 10 uses the parameter which is input to the interactive program generator 9, to automatically generate an indexing robot preprogram. The robot indexing supporter 10 executes a support process when an indexing execution operation is executed from the UI provided on the interactive program generator 9, to automatically generate the indexing robot preprogram, and automatically generates a machine tool program for requesting execution of the indexing robot preprogram. Then, when the user presses a startup button, the robot is automatically indexed to the designated point. After the indexing is completed, the robot position is finely adjusted by a manual operation of the operation panel 2, and the teaching point is determined from the current position of the robot in the interactive program generator 9. The robot indexing supporter 10 stores the indexing robot preprogram and the machine tool program for requesting execution of the indexing robot preprogram, which are automatically generated, in the storage unit 12.

The machine tool control unit 11 controls operations of various parts of the machine tool. In the present embodiment, the machine tool control unit 11 in particular outputs the operation information or the like of the robot operation UI to the robot operation command generator 3, reads the robot preprogram stored in the storage unit 12, and outputs the read robot preprogram to the robot preprogram execution requester 4.

The storage unit 12 stores the robot preprogram, the machine tool program, and the 3D model. The robot preprogram is generated by the interactive program generator 9 and the robot indexing supporter 10 in response to the operation by the user. The 3D model is generated in advance and stored.

The robot operation command generator 3, the robot preprogram execution requester 4, the machine tool operation command receiver 5, the interference checker 6, the machine tool 3D model transferrer 7, the interactive program generator 9, the robot indexing supporter 10, and the machine tool control unit 11 may be formed by one or a plurality of CPUs. The one or a plurality of CPUs realize these functions by reading and executing a process program stored in a program memory such as a ROM. Alternatively, a part of these functions may be realized not by a software process by execution of a program, but by a hardware process. The hardware process may be executed, for example, using circuits such as an ASIC, an FPGA (field programmable gate array), or the like.

Next, the robot preprocessor 20 will be described.

The robot preprocessor 20 is a processor for achieving interlocking between the machine tool controller 1 and the robot controller 30. The robot preprocessor 20 may exist as a single entity, may be equipped on the machine tool controller 1, or may be equipped on the robot controller 30.

When the processor exists as a single entity or is equipped on the machine tool controller 1, it is desirable that the robot can be operated independent of the type of the robot controller 30 (more specifically, a manufacturer of the robot controller 30). In addition, when the processor exists as a single entity or is equipped in the robot controller 30, it is desirable that the processor does not depend on the type of the machine tool controller 1 (more specifically, a manufacturer of the machine tool controller 1).

The robot preprocessor 20 comprises a robot preprogram interpreter 21, a robot controller control command generator 22, a robot operation command receiver 23, a robot preprogram receiver 24, a machine tool 3D model receiver 25, a machine tool operation command generator 26, communicators 27 and 28, and a storage unit 29.

In accordance with a control command from the robot operation command receiver 23, the robot preprogram interpreter 21 reads the robot preprogram prepared for the robot preprocessor 20 from the storage unit 29, interprets the read robot preprogram, and outputs the interpreted result to the robot controller control command generator 22. In addition, when it is necessary to generate an operation command for the machine tool as a result of the interpretation of the robot preprogram, the robot preprogram interpreter 21 outputs the interpreted result to the machine tool operation command generator 26.

In accordance with a robot preprogram command interpreted by the robot preprogram interpreter 21, the robot controller control command generator 22 uses the 3D model which is read from the storage unit 29, and generates a control command for operating the robot controller 30 such as a robot command value for avoiding interference, a control command of an I/O connection point provided on the robot controller 30, or the like. The robot controller control command generator 22 transmits the generated control command via the communicator 28 to the robot controller 30. The robot controller control command generator 22 also controls an operation corresponding to a command received from the robot operation command receiver 23. For example, the robot controller control command generator 22 reflects the override value of the machine tool received from the robot operation command receiver 23 in the robot command value in real time.

The robot operation command receiver 23 receives a robot operation command which is generated by the robot operation command generator 3 of the machine tool controller 1 and transferred via the communicators 8 and 27. The robot operation command receiver 23 outputs the received robot operation command to the robot preprogram interpreter 21 and the robot controller control command generator 22. The robot operation command receiver 23 also receives an axis position notification of the machine tool, and reflects the same in the 3D model of the machine tool stored in the storage unit 29. In a configuration wherein the 3D model to which the axis position is added by the machine tool 3D model transferrer 7 is transferred, this process is not necessary.

The robot preprogram receiver 24 receives the robot preprogram transferred from the robot preprogram execution requester 4 of the machine tool controller 1 via the communicators 8 and 27. The robot preprogram receiver 24 stores the received robot preprogram in the storage unit 29. The robot preprogram stored in the storage unit 29 is interpreted by the robot preprogram interpreter 21, as described above.

The machine tool 3D model receiver 25 receives the 3D model which is transferred from the machine tool 3D model transferrer 7 of the machine tool controller 1 via the communicators 8 and 27. The machine tool 3D model receiver 25 stores the received 3D model in the storage unit 29. The 3D model stored in the storage unit 29 is used for generation of the robot command value for avoiding interference by the robot controller control command generator 22 as described above. A format of the 3D model is not particularly limited.

The machine tool operation command generator 26 transmits the operation request for the machine tool to the machine tool operation command receiver 5 of the machine tool controller 1 via the communicators 27 and 8. The operation request for the machine tool is transmitted when it is necessary to generate the operation command for the machine tool as a result of interpretation of the robot preprogram by the robot preprogram interpreter 21. For example, the operation is an open/close operation of a machine tool safety door during an operation of the robot, or the like. The operation command includes a joint angle of the robot.

The communicator 27 executes a communication process with the machine tool controller 1. By fixing a communication algorithm, the machine tool controller 1 can operate robots of various manufacturers by the fixed communication algorithm.

The communicator 28 executes a communication process with the robot controller 30. When a configuration is to be employed in which the robot preprocessor 20 does not depend on the type of the robot controller 30, a difference in the communication algorithm may be smoothened out by the communicator 28.

The storage unit 29 stores the machine tool 3D model and the robot preprogram transferred from the machine tool controller 1.

The robot preprogram interpreter 21, the robot controller control command generator 22, the robot operation command receiver 23, the robot preprogram receiver 24, the machine tool 3D model receiver 25, and the machine tool operation command generator 26 may be formed by one or a plurality of CPUs. The one or a plurality of CPUs realize these functions by reading a process program stored in a program memory such as a ROM and executing the process program. Alternatively, a part of these functions may be realized not by a software process by execution of a program, but by a hardware process. The hardware process may be executed, for example, using circuits such as an ASIC and an FPGA (field programmable gate array).

The robot controller 30 controls the robot according to the control command transmitted from the robot preprocessor 20. A form of the robot is arbitrary, and the robot may be, for example, an in-machine robot which is placed in the machine tool and which executes attachment and detachment of the workpiece (workpiece loading/workpiece unloading).

Figure 2:
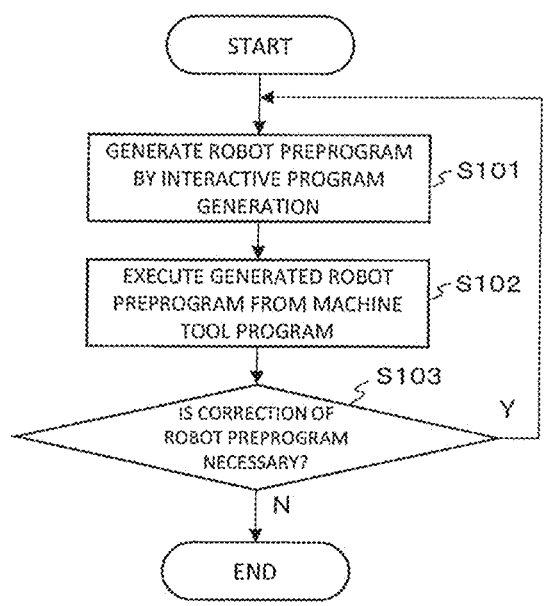
FIG. 2 is a process flowchart (part 1) of an embodiment of the present disclosure.

FIG. 2 shows an overall process flowchart of the present embodiment.

The user of the machine tool operates the operation panel 2 of the machine tool controller 1, to generate the robot preprogram by the interactive program generator 9 (S101). The interactive program generator 9 automatically generates the robot preprogram including the parameters which are input by the user of the machine tool following a guidance using the machine tool operation UI and the robot operation UI. The user of the machine tool can easily generate the robot preprogram by merely inputting the parameters. The interactive program generator 9 has a UI for executing the robot indexing supporter 10, and determines a teaching point from the current position of the robot. The interactive program generator 9 stores the generated robot preprogram in the storage unit 12.

The robot indexing supporter 10 is processed when the user of the machine tool judges that fine adjustment of the position is necessary and executes an indexing execution operation from the UI provided on the interactive program generator 9. The robot indexing supporter 10 uses the parameters which are input to the interactive program generator 9 to automatically generate the indexing robot preprogram, and also automatically generates a tool machine program for requesting execution of the indexing robot preprogram. When the user of the machine tool presses a startup button, the indexing of the robot is automatically executed. After the indexing is completed, the robot position is finely adjusted by a manual operation of the operation panel 2, and the teaching point is established in the interactive program generator 9 from the current position of the robot. The robot indexing supporter 10 stores in the storage unit 12 the automatically generated indexing robot preprogram and the automatically generated machine tool program for requesting the execution of the indexing robot preprogram.

Next, the user of the machine tool describes a robot preprogram execution request command in the machine tool program and executes the program. The machine tool control unit 11 of the machine tool controller 1 reads the robot preprogram from the storage unit 12 and outputs the read preprogram to the robot preprogram execution requester 4, and the robot preprogram execution requester 4 transfers the robot preprogram to the robot preprocessor 20 and outputs an execution request (S102).

The robot preprocessor 20 interprets the transferred robot preprogram by the robot preprogram interpreter 21. The interpreted robot preprogram is output to the robot controller control command generator 22, and the robot controller control command generator 22 generates the robot command value according to the robot preprogram, and outputs the generated robot command value to the robot controller 30, to thereby drive the robot. The user of the machine tool checks the operation, and judges whether or not it is necessary to correct the robot preprogram (S103). For example, the machine tool is set to a simulation mode by the operation panel 2, a simulation mode request is also notified by the robot operation command generator 3 to the robot preprocessor 20 and is shared, and an interlocking operation between the machine tool and the robot is checked on the simulation without actually operating the machine tool and the robot. As a result of the checking, when it is necessary to correct the robot preprogram (YES in S103), the user of the machine tool edits the operation generated by the interactive program generator 9. When it is not necessary to correct the robot preprogram (NO in S103), the teaching work is completed.

Figure 3:
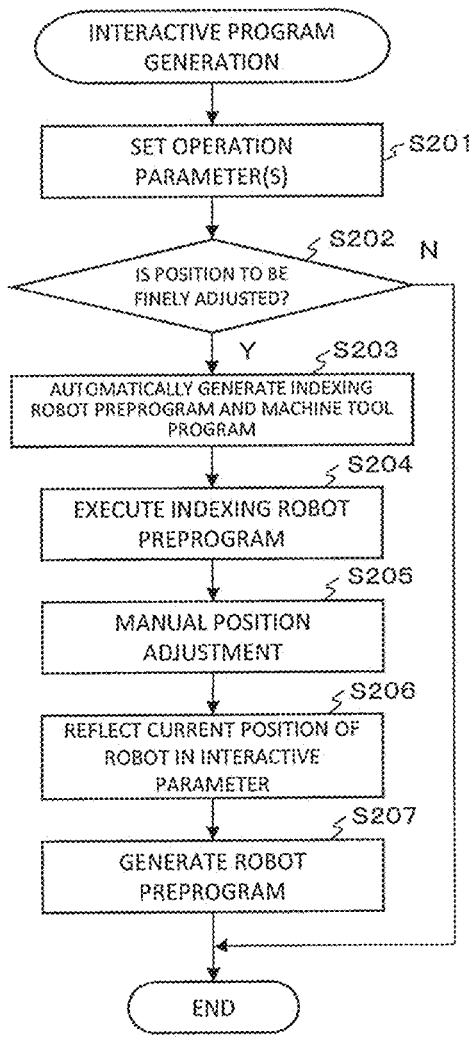
FIG. 3 is a process flowchart (part 2) of an embodiment of the present disclosure.

FIG. 3 is a detailed flowchart of the process of S101 of FIG. 2; that is, the robot preprogram generation process at the interactive program generator 9.

First, the user of the machine tool manipulates the operation panel 2 to set one or more operation parameters necessary for the operation of the robot (S201). The operation parameter(s) are determined according to the operation of the robot. For example, when the operation of the robot is workpiece unloading, the parameter may include:
an air ejection during gripping (whether or not the process is to be executed);
a pusher (whether or not to use the pusher);
a workpiece withdrawal amount;
a grip approach amount; and
a grip offset.

These operation parameters are set by the user of the machine tool by operating a form (template) screen generated by the interactive program generator 9 and displayed on the operation panel 2. A specific example of the template screen will be described later in detail.

Next, the user of the machine tool judges whether or not the fine adjustment of the position is to be executed (S202). The judgement is made based on the operation parameter(s) to be set. For example, while the parameters such as the air ejection during gripping, the workpiece withdrawal amount, and the like do not require the fine adjustment of the position, the gripping offset may require the fine adjustment of the position.

When the position is to be finely adjusted (YES in S202), the user of the machine tool presses a "provisional position indexing" button on the operation panel 2, to cause the robot indexing supporter 10 to be executed. The robot indexing supporter 10 automatically generates the indexing robot preprogram using the operation parameter which is set in S201 (S203). The robot indexing supporter 10 also automatically generates the machine tool program for requesting the execution of the indexing robot preprogram. When the user of the machine tool presses the startup button from the operation panel 2, the indexing robot preprogram is executed in response to this process (S204), and the robot is automatically indexed to a designated point on a path avoiding interference.

After the robot is indexed to the designated point, the robot position is finely adjusted by the manual operation of the operation panel (S205). After the fine adjustment, when the user of the machine tool presses a "read current position" button on the operation panel 2, the interactive program generator 9 reflects the current position of the robot to the parameters in response to this process (S206).

The fine adjustment of the position is executed in a manner as described above, and at the end, the robot preprogram is generated and stored in the storage unit 12 (S207).

When the position is not to be finely adjusted (NO in S202), the processes of S203~S207 do not need to be executed.

Figure 4:
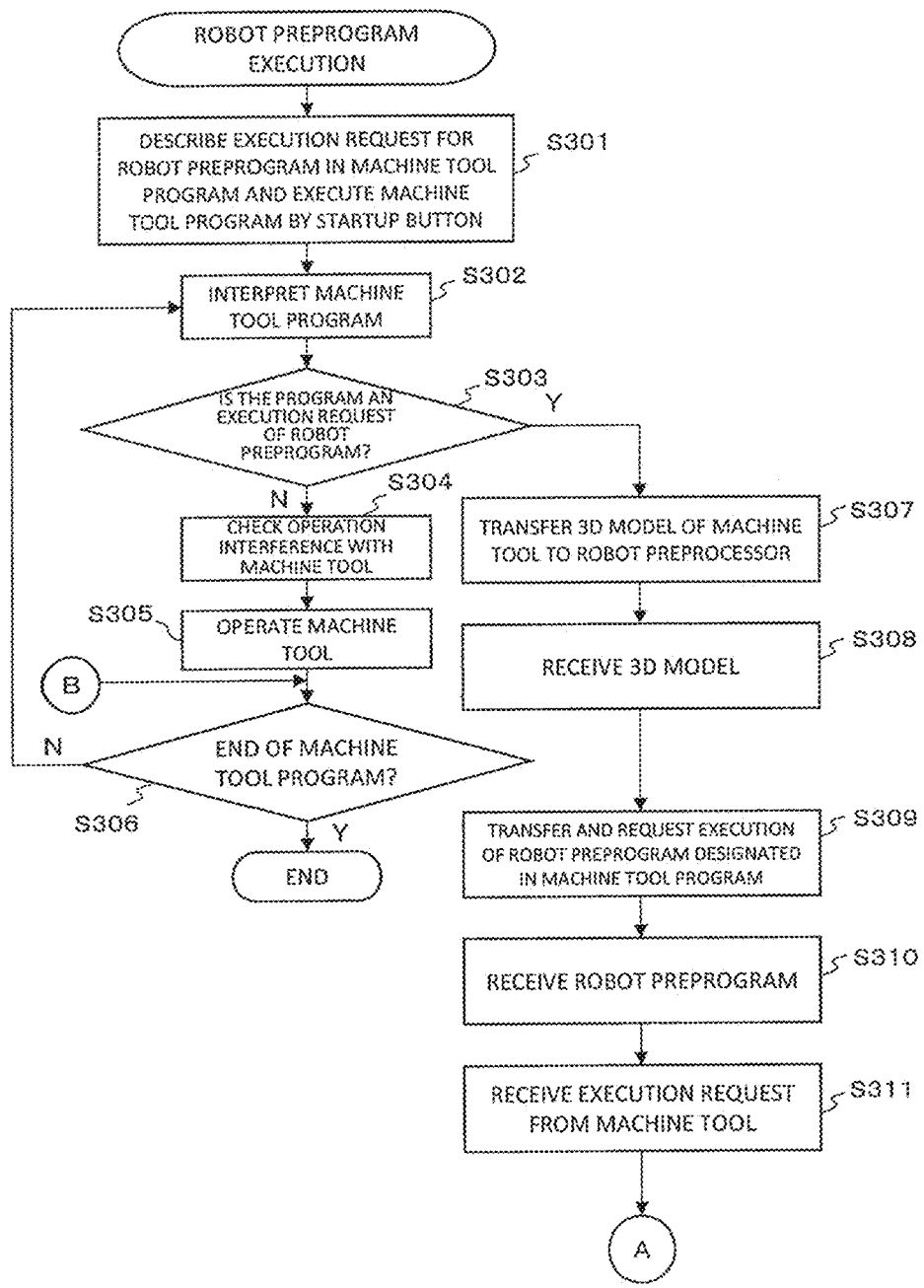
FIG. 4 is a process flowchart (part 3) of an embodiment of the present disclosure.
Figure 5:
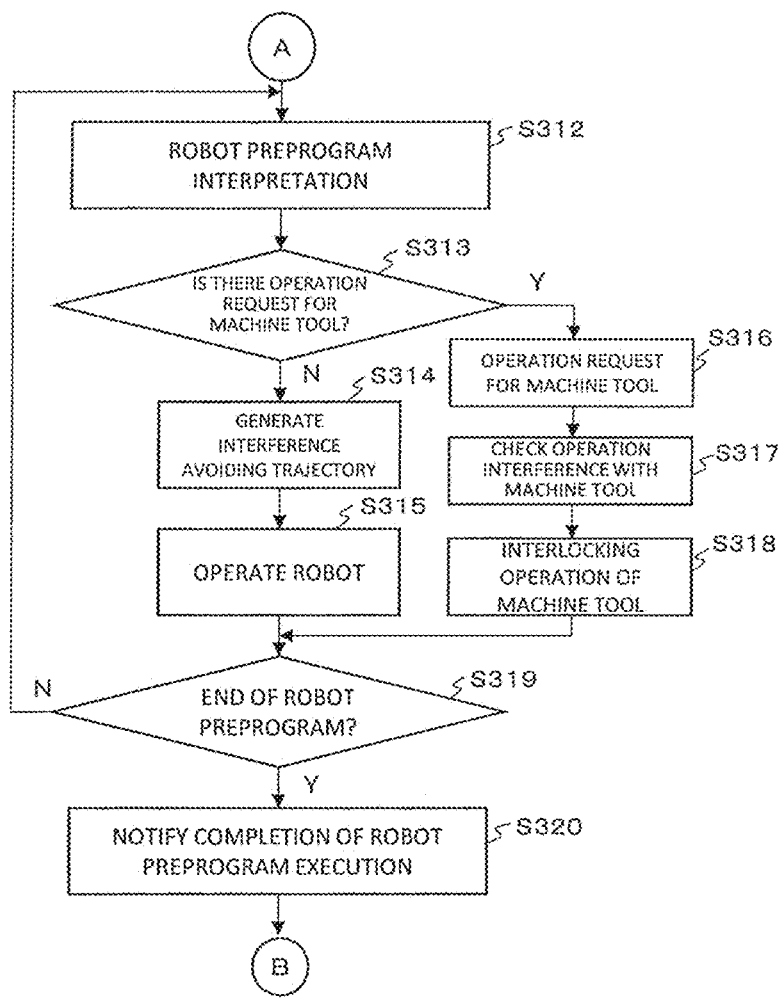
FIG. 5 is a process flowchart (part 4) of an embodiment of the present disclosure.

FIG. 4 and FIG. 5 show detailed flowcharts of the process of S102 of FIG. 2; that is, the execution process of the robot preprogram.

First, in FIG. 4, the user of the machine tool describes, in the machine tool program, a request for executing the robot preprogram generated in the process shown in FIG. 3 and stored in the storage unit 12, and executes the machine tool program by operation of the startup button (S301).

The machine tool control unit 11 interprets the machine tool program (S302), and judges whether or not the program is a request for execution of the robot preprogram (S303). When the program is not the execution request of the robot preprogram (NO in S303), the interference checker 6 executes an operation interference checking of the machine tool (S304). The interference checker 6 checks the presence or absence of the interference of the machine tool and the robot during the operation of the machine tool using the 3D model stored in the storage unit 12. In this process, the interference checking is executed using the information of the joint angle of the robot which is transmitted from the machine tool operation command generator 26 of the robot preprocessor 20. The machine tool is then operated according to the machine tool program (S305). These processes are repeatedly executed until the end of the machine tool program is reached (S306).

On the other hand, when the program is the execution request for the robot preprogram (YES in S303), the 3D model of the machine tool is transferred from the machine tool 3D model transferrer 7 to the robot preprocessor 20 (S307).

The machine tool 3D model receiver 25 of the robot preprocessor 20 receives the 3D model transferred from the machine tool controller 1, and stores the 3D model in the storage unit 29 (S308).

Further, the machine tool control unit 11 and the robot preprogram execution requester 4 transfer the robot preprogram, designated by being described in the machine tool program, to the robot preprocessor 20 and output an execution request (S309).

The robot preprogram receiver 24 of the robot preprocessor 20 receives the robot preprogram transferred from the machine tool controller 1, and stores the preprogram in the storage unit 29 (S310). In addition, the robot operation command receiver 23 receives the execution request transferred from the machine tool controller 1 (S311). The process then proceeds to the process of FIG. 5.

In FIG. 5, when the execution request is received by the robot operation command receiver 23, the robot preprogram interpreter 21 reads the robot preprogram from the storage unit 29 in response to this process, and interprets the robot preprogram (S312). The robot preprogram interpreter 21 outputs the interpretation result to the robot controller control command generator 22.

The robot preprogram interpreter 21 also judges whether or not there is an operation request for the machine tool, as a result of the interpretation of the robot preprogram (S313). For example, as a result of the interpretation of the robot preprogram, when it is found that there is an open/close operation of the machine tool safety door during operation of the robot, it is judged that there is an operation request for the machine tool.

When there is no operation request for the machine tool (NO in S313), the robot controller control command generator 22 generates a trajectory of the robot avoiding the interference using the 3D model according to the robot preprogram interpreted by the robot preprogram interpreter 21 (S314), and outputs the trajectory to the robot controller 30, so that the robot is operated (S315). For the generation of the trajectory avoiding the interference, for example, an RRT (Rapidly-exploring Random Trees) method may be employed. This is a method in which a point in a configuration space (C-space) is randomly searched to construct a free space in a search tree form, and initial configuration points in the space and target configuration points are connected on the search tree, to thereby obtain a path. The generation of the avoidance trajectory is not limited to this method, and any other arbitrary algorithm may be employed.

On the other hand, when there is an operation request for the machine tool (YES in S313), the machine tool operation command generator 26 transmits the operation request to the machine tool controller 1 (S316). The machine tool operation command receiver 5 of the machine tool controller 1 receives the operation request transferred from the robot preprocessor 20, and outputs the operation request to the machine tool control unit 11. The machine tool control unit 11 executes the operation interference checking of the machine tool similar to S304 of FIG. 4 according to the received operation request (S317), and operates the machine tool in the interlocking operation (S318).

The processes of S312~S318 are repeatedly executed until the robot preprogram is completed (NO in S319).

When the robot preprogram is completed (YES in S319), the robot preprogram interpreter 21 outputs an execution completion notification of the robot preprogram to the machine tool operation command generator 26 (S320), and executes the processes from S306 of FIG. 4.

That is, it is judged whether or not the end of the machine tool program is reached (S306), and, if the end is reached, the process is completed. On the other hand, when the end is not reached, the processes from S302 are repeated.

As described, in the present embodiment, the execution request of the robot preprogram and the robot preprogram name are described in the machine tool program, and when the machine tool program is executed, the machine tool control unit 11 transfers the robot preprogram stored in the storage unit 12 of the machine tool controller 1 to the robot preprocessor 20. The transfer of the robot preprogram to the robot preprocessor 20 is executed for each execution request of the robot preprogram. The robot preprogram stored in the storage unit 12 of the machine tool controller 1 is handled as master data, and the robot preprogram stored in the storage unit 29 of the robot preprocessor 20 is handled as temporary data. Alternatively, a configuration may be employed in which the robot preprogram serving as the temporary data stored in the storage unit 29 of the robot preprocessor 20 is not deleted even after execution, and the robot preprogram may be verified with the master data of the robot preprogram stored in the storage unit 12 of the machine tool controller 1 each time the program is used.

In addition, in the present embodiment, when the machine tool program is executed, the machine tool control unit 11 transfers the 3D model stored in the storage unit 12 of the machine tool controller 1 to the robot preprocessor 20. The transfer of the 3D model to the robot preprocessor 20 is executed for each execution request of the robot preprogram, similar to the transfer of the robot preprogram. The 3D model stored in the storage unit 12 of the machine tool controller 1 is handled as master data, and the 3D model stored in the storage unit 29 of the robot preprocessor 20 is handled as temporary data. With this configuration, even when the simulation environment of the machine tool controller 1 is changed such as in the case of a tool change or the like, the simulation environment of the robot preprocessor 20 can be matched with the environment of the machine tool controller 1 after the change.

FIG. 6 shows an example of a parameter setting screen displayed on the operation panel of the machine tool. The screen is a screen generated by the interactive program generator 9, and is a screen generated as a template for each operation by stylizing tasks of the robot in advance.

In this case, the operation of the robot is "workpiece unloading", and each of the parameters to be set is shown as an [operation parameter] 100. Here, the following parameters are displayed:
1. an air ejection during gripping (whether or not to execute air ejection);
2. a pusher (whether or not to use the pusher);
3. a workpiece withdrawal amount:
4. a grip approach amount: and
5. a grip offset.

In addition, on the right of the [operation parameters] 100, a guide drawing 200 schematically showing a chuck, the workpiece, the robot, or the like related to the operation to be generated is displayed, and items of the [operation parameters] 100 are shown in this drawing by, for example, the number. By referring to the guide drawing 200, the user of the machine tool can easily understand to which portion of the operation to be generated the respective items of the [operation parameter] 100 correspond. The user of the machine tool sets these items by selecting from a menu or by inputting a numerical value.

When the fine adjustment of the position is necessary, for example, when the grip offset is to be finely adjusted, the user of the machine tool presses, after setting the operation parameter, a "provisional position indexing" button 300. With this process, the processes shown in S203~S207 of FIG. 3 are executed. Specifically, the robot indexing supporter 10 automatically generates the indexing robot preprogram using the set operation parameter (S203), and also automatically generates the machine tool program for requesting execution of the indexing robot preprogram. The indexing robot preprogram is executed (S204), and the robot is automatically indexed to the designated point.

After the robot is indexed to the designated point, the user of the machine tool finely adjusts the robot position by the manual operation of the operation panel 2 (primarily by a jog switch and a pulse handle). After the fine adjustment, the user of the machine tool presses a "read current position" button 400 on the operation panel 2, and the current position of the robot is reflected in the operation parameter in response to this process (S206).

The "robot preprogram" in the present embodiment is named this way because the program is interpreted by the robot preprocessor 20, and the control command of the robot is generated based on the interpretation and is output to the robot controller 30. When the robot preprocessor 20 is equipped in the robot controller 30, the "robot preprogram" may also be considered as the "robot program" itself.

The invention claimed is:

1. A machine tool system comprising:
a machine tool controller that controls a machine tool; and
a robot preprocessor that is connected to the machine tool controller in a manner to allow transmission and reception of data, wherein
the machine tool controller comprises:
an operation panel which sets an operation parameter of a robot and which enables a manual operation of the robot;
a robot preprogram generator which generates a robot preprogram using the set operation parameter and the manual operation;
a controller which controls the machine tool by executing a machine tool program and which transmits the robot preprogram to the robot preprocessor;
an interference checker which checks presence or absence of interference between the machine tool and the robot based on 3D models of the machine tool and the robot;
a first storage unit which stores the robot preprogram and the 3D model; and
a notifier which notifies manual operation information to the robot, and
the robot preprocessor comprises:
a robot preprogram executer which receives the robot preprogram transmitted from the machine tool controller and outputs a control command to a robot controller which controls the robot according to the robot preprogram;
a second storage unit which stores the robot preprogram and the 3D model transmitted from the machine tool controller; and
a control command outputter which outputs a robot control command based on the manual operation information.

2. The machine tool system according to claim 1, wherein the robot preprocessor further comprises a communicator which transmits a joint angle of the robot to the machine tool controller, and
the interference checker checks the presence or absence of the interference between the machine tool and the robot using the joint angle of the robot.

3. The machine tool system according to claim 1, wherein the machine tool controller further comprises a communicator which transmits the 3D model of the machine tool to the robot preprocessor, and
the robot preprogram executer generates a path of the robot which avoids interference with the machine tool based on the 3D model, and outputs the control command.

4. The machine tool system according to claim 1, wherein the controller of the machine tool controller executes a machine tool program, and transmits the robot preprogram to the robot preprocessor based on a name of the robot preprogram described in the machine tool program.

5. The machine tool system according to claim 1, wherein the robot preprogram generator of the machine tool controller generates a template screen for each stylized operation of the robot, and displays the template screen on a display of the operation panel, and the operation parameter is set on the template screen.

6. The machine tool system according to claim 5, wherein the robot preprogram generator of the machine tool controller indexes the robot using the set operation parameter, and, when the indexed position of the robot is finely adjusted by the manual operation, generates the robot preprogram while reflecting a position after the fine adjustment in the operation parameter.

7. The machine tool system according to claim 1, wherein the robot preprogram and the 3D model are read from the first storage unit of the machine tool controller, are transmitted to the robot preprocessor, and are stored in the second storage unit each time there is a request for execution of the robot preprogram during execution of the machine tool program.

8. The machine tool system according to claim 1, wherein the robot preprocessor is equipped on the machine tool controller.

9. The machine tool system according to claim 1, wherein the robot preprocessor is equipped on the robot controller.

10. A machine tool system comprising:
a machine tool controller that controls a machine tool; and
a robot preprocessor that is connected to the machine tool controller in a manner to allow transmission and reception of data, wherein
the machine tool controller comprises:
an operation panel which sets an operation parameter of a robot and which enables a manual operation of the robot; and
a first processor configured to, by executing a first program stored in a first memory:
generate a robot preprogram using the set operation parameter and the manual operation;
execute a machine tool program to control the machine tool, and transmit the robot preprogram to the robot preprocessor;
by executing the first program, check presence or absence of an interference between the machine tool and the robot based on 3D models of the machine tool and the robot,
storing the robot preprogram and the 3D model in a first storage unit of the machine tool controller; and
notify manual operation information to the robot, and the robot preprocessor comprises:
a second processor configured to, by executing a second program stored in a second memory:
receive the robot preprogram transmitted from the machine tool controller;
storing the robot preprogram and the 3D model transmitted from the machine tool controller in a second storage unit;
output a control command to a robot controller which controls the robot according to the robot preprogram; and
output a robot control command based on the manual operation information.

11. The machine tool system according to claim 10, wherein
the second processor is further configured to, by executing the second program: transmit a joint angle of the robot to the machine tool controller, and
the first processor is configured to check the presence or absence of the interference between the machine tool and the robot using the joint angle of the robot.

12. The machine tool system according to claim 10, wherein
the first processor is further configured to, by executing the first program: transmit the 3D model of the machine tool to the robot preprocessor, and
the second processor is further configured to: generate a path of the robot which avoids interference with the machine tool based on the 3D model; and output the control command.

13. The machine tool system according to claim 10, wherein
the first processor is further configured to, by executing the first program:
execute a machine tool program; and
transmit the robot preprogram to the robot preprocessor based on a name of the robot preprogram described in the machine tool program.

14. The machine tool system according to claim 10, wherein
the first processor is further configured to, by executing the first program:
generate a template screen for each stylized operation of the robot, and display the template screen on a display of the operation panel; and
set the operation parameter on the template screen.

15. The machine tool system according to claim 14, wherein
the first processor is further configured to, by executing the first program:
index the robot using the set operation parameter; and
when the indexed position of the robot is finely adjusted by the manual operation, generate the robot preprogram while reflecting a position after the fine adjustment in the operation parameter.

* * * * *